March 19, 1957  R. G. GIBSON  2,785,491
FISHING ROD SIGNAL
Filed Oct. 22, 1956
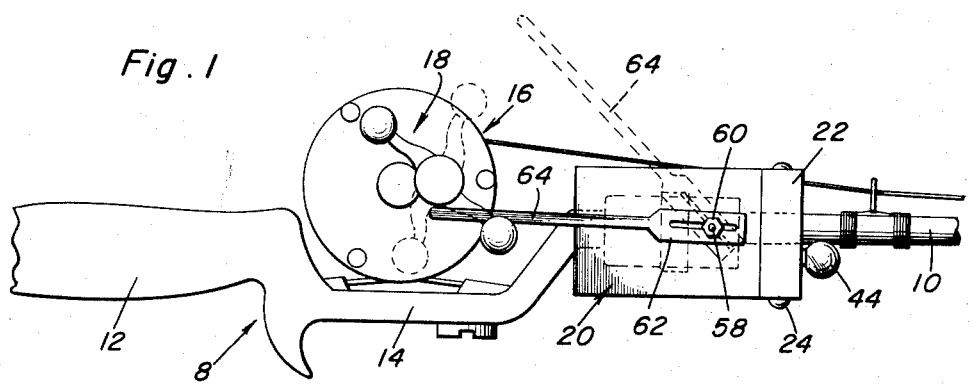
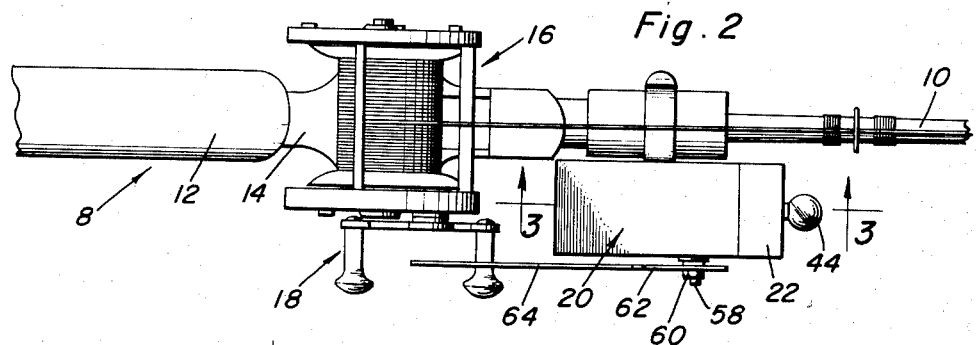
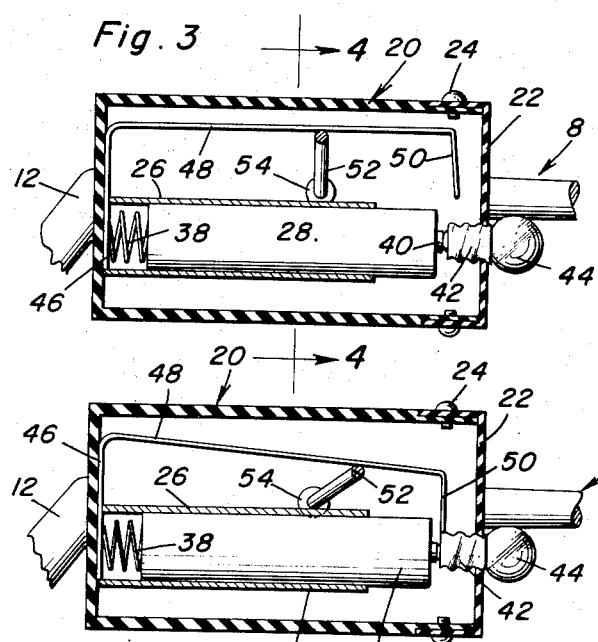
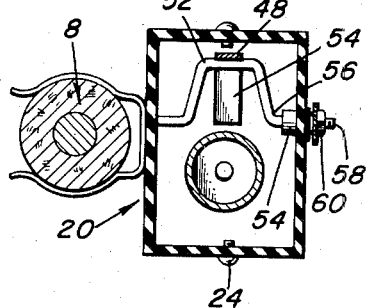
Rollo G. Gibson
INVENTOR.
BY *Clarence A. O'Brien*
and *Harvey B. Jacobson*
Attorneys

2,785,491

FISHING ROD SIGNAL

Rollo G. Gibson, Zeona, S. Dak.

Application October 22, 1956, Serial No. 617,504

5 Claims. (Cl. 43—17)

The present invention relates to improved signalling means which when mounted on a fishing rod, as herein intended and prescribed, will automatically inform the user thereof that a fish has taken the baited line.

Stated somewhat more explicitly, the invention pertains to visual signalling means which functions when a strike has been made, is characterized by structural means which is readily applicable to a conventional type fishing rod and which utilizes a pivotally mounted trip arm one end of which is cooperable with crank type handle means such as is utilized on a fishing rod reel.

In carrying out a preferred embodiment of the invention a small flashlight is employed. This is arranged for operation in a box-like housing having a clip which is releasably engageable with the fishing rod. The aforementioned trip arm is adjustably mounted on the casing and, in fact, is operatively connected with a crank member which is located for operation in the casing and which, in turn, serves to release a resilient contact finger which, when it contacts the usual bulb base, closes the circuit and flashes the awaited signal.

Other objects, features and advantages will become more readily apparent from the following description and the accompanying drawing.

In the drawing:

Fig. 1 is a side elevation showing a fragmentary portion of the conventional type of fishing rod and reel and also showing the improved signal device and the manner in which it is constructed and used;

Fig. 2 is a top plan view of the same;

Fig. 3 is a section on a slightly enlarged scale taken on the line 3—3 of Fig. 2 with portions appearing in elevation;

Fig. 4 is a cross-section on the vertical line 4—4 of Fig. 2; and

Fig. 5 is a view similar to Fig. 3 showing the relationship of parts when the circuit is closed and the flashbulb gives the visible signal.

Referring now to the drawings in Figs. 1 and 2 the conventional type fishing rod is denoted by the numeral 8 and embodies the rod proper 10, handle 12 and seat 14 in which an equally conventional type line winding reel 16 is mounted. This is the type of a reel which has crank-like handle means 18 beyond one head constructed and functioning in a well known manner. The invention is in the form of an attachment which lends itself to use on the rod without requiring any alterations. The invention in its preferred embodiment comprises a relatively small box-like case or casing 20 which is open at one end to accommodate a readily applicable and removable cover 22 held in place by suitable fasteners 24. On the interior there is a cylindrical holder 26 for the dry cell or battery 28. The battery is projected beyond the open end of the cylinder by way of a coil spring 30 in a generally well known manner. The contact button 40 cooperates with a button on the usual screw base 42 of the flashlight bulb 44. In order to switch the bulb or light on circuit make and break means is provided and this comprises a substantially U-shaped member located in the casing and having an end portion 46 in electrical cooperation with the coil spring 30 having its bight portion 48 paralleling the cylindrical holder 26. The free lateral end 50 forms a contact finger and is movable toward and from the screw base 42 as is evident by comparing Figs. 3 and 5. The inherent resiliency of the spring finger is such that it is normally urged into engagement with a screw base and therefore it is necessary to provide mechanical means here to disengage the finger and this comprises a simple trigger which takes the form of a crank 52. The crank has its end portions journaled for rotation in bearings one of which is shown at the right at 54 in Fig. 4. The other bearing is of any appropriate construction. This is the operating or shaft end portion 56 of the crank and it will be noted that the crank proper is interposed between the bight portion 48 and the cylindrical holder 26 and normally is positioned as seen in Fig. 3 where it overcomes the inherent spring tension of the circuit make and break finger and keeps it disengaged as shown. It will be noticed that the shaft portion 56 extends to the exterior of the cooperating wall of the case where it is screw threaded at 58 to accommodate a nut 60 which serves to adjustably connect the slotted head portion 62 of the trip arm 64 therewith. The slotted connection is not only adjustable but effective in imparting rotation to the shaft portion 56 and also the trigger or crank 52. The free end portion of the arm is arranged so that it cooperates with the crank handle 18 on the reel. It follows that when the reel crank travels backward indicating a strike the trip arm will be actuated and will in turn release the trigger or crank 52 and the spring contact finger 54 allowing the same to move from its set position in Fig. 3 to its operative position seen in Fig. 5. When this happens the flashlight bulb comes on and gives a visible signal that a strike has been made.

Although the invention, being in the form of a flashlight, is preferably intended for night fishing it is obvious that by using a small signalling flag on the trip arm 54 the flag would serve as a satisfactory signal for day fishing.

Minor changes in shape, size and rearrangement of parts may be resorted to in actual practice without departing from the spirit of the invention or the scope of the invention as claimed.

What is claimed as new is as follows:

1. An attachment for a fishing rod having a reel, said attachment comprising a flashlight bulb and cooperating dry cell, a resilient circuit make and break finger the resiliency of which is such that the finger is normally urged into electrical contact with the base of the bulb for purposes of closing the circuit, a trigger cooperating with said finger and normally disengaging the same from said bulb base, and a trip arm one end of which is operatively connected with said trigger and the other end of which is operatively cooperable with the usual crank-like handle means on the stated reel.

2. The structure defined in claim 1 and wherein said one end of said trip arm is of slotted construction and is detachably and adjustably connected with a cooperating end portion of said trigger.

3. The structure defined in claim 1 and wherein said one end of said trip arm is of slotted construction and is detachably and adjustably connected with a cooperating end portion of said trigger, and wherein said trigger comprises a crank mounted for rotation and having an intermediate portion thereof in wiping and operating contact with the cooperating intermediate portion of said contact finger.

4. An attachment for a fishing rod having the usual reel seat and reel mounted in said seat and wherein said reel is provided with a head beyond which crank-like handle means is provided, said attachment comprising a case, a holder in said case, a spring biased dry cell operatively mounted in said holder, a flashlight bulb carried by said case and cooperable with a cooperating end portion of said dry cell, said case being provided with aligned bearings, a shaft having a crank, said crank constituting a trigger, a substantially U-shaped circuit make and break member in said case having one end portion cooperating with the dry cell holder, having an intermediate portion cooperating with said crank, and having a free end portion providing a contact finger and automatically movable by inherent spring properties into electrical engagement with the base of said bulb, and a reel actuated trip arm having one end connected with said crank shaft.

5. The structure defined in claim 4 and wherein said one end is provided with a slotted head detachably and adjustably mounted on the cooperating end of said crank shaft.

References Cited in the file of this patent
UNITED STATES PATENTS

| | | |
|---|---|---|
| 2,643,371 | Sleeger | June 23, 1953 |
| 2,755,590 | Collins | July 24, 1956 |
| 2,771,703 | Jones | Nov. 27, 1956 |